United States Patent [19]
Gabriel

[11] Patent Number: 5,687,672
[45] Date of Patent: Nov. 18, 1997

[54] PRESSURE INDICATOR FOR TIRES

[76] Inventor: Earl W. Gabriel, 445 Fredericks Rd., Johnson City, N.Y. 13790

[21] Appl. No.: 585,943

[22] Filed: Jan. 16, 1996

[51] Int. Cl.$^6$ .............................. B60C 23/04; G01L 7/08
[52] U.S. Cl. .............. 116/34 R; 73/146.8; 116/272
[58] Field of Search .................. 73/146.8; 137/227, 137/557; 116/34 R, 272

[56] References Cited

U.S. PATENT DOCUMENTS

| | | | |
|---|---|---|---|
| 1,291,901 | 1/1919 | Hurd | 73/146.8 |
| 2,738,752 | 3/1956 | Dascombe | 116/34 R |
| 2,794,343 | 6/1957 | Lagrange | 116/34 R |
| 2,795,204 | 6/1957 | Rose | 116/34 R |
| 3,236,097 | 2/1966 | Tessmer | 116/34 R |
| 3,779,080 | 12/1973 | Smith | 116/272 X |
| 3,910,120 | 10/1975 | Martin | 73/146.8 X |
| 4,606,391 | 8/1986 | Achterholt | 116/34 R X |

*Primary Examiner*—William A. Cuchlinski, Jr.
*Assistant Examiner*—Willie Morris Worth

[57] ABSTRACT

A pressure indicator for tires comprised of a lower cylindrical housing dimensioned for removable coupling with a valve stem of a tire. A flexible diaphragm is disposed within the lower cylindrical housing. An upper cylindrical housing is coupled with the lower cylindrical housing. A T-shaped indicating pin extends through the upper cylindrical housing to couple with the flexible diaphragm. A tri-level spring is coupled around the T-shaped indicating pin. A magnifying dome couples with the upper cylindrical housing. The magnifying dome has an indicating chart positioned therein.

7 Claims, 3 Drawing Sheets

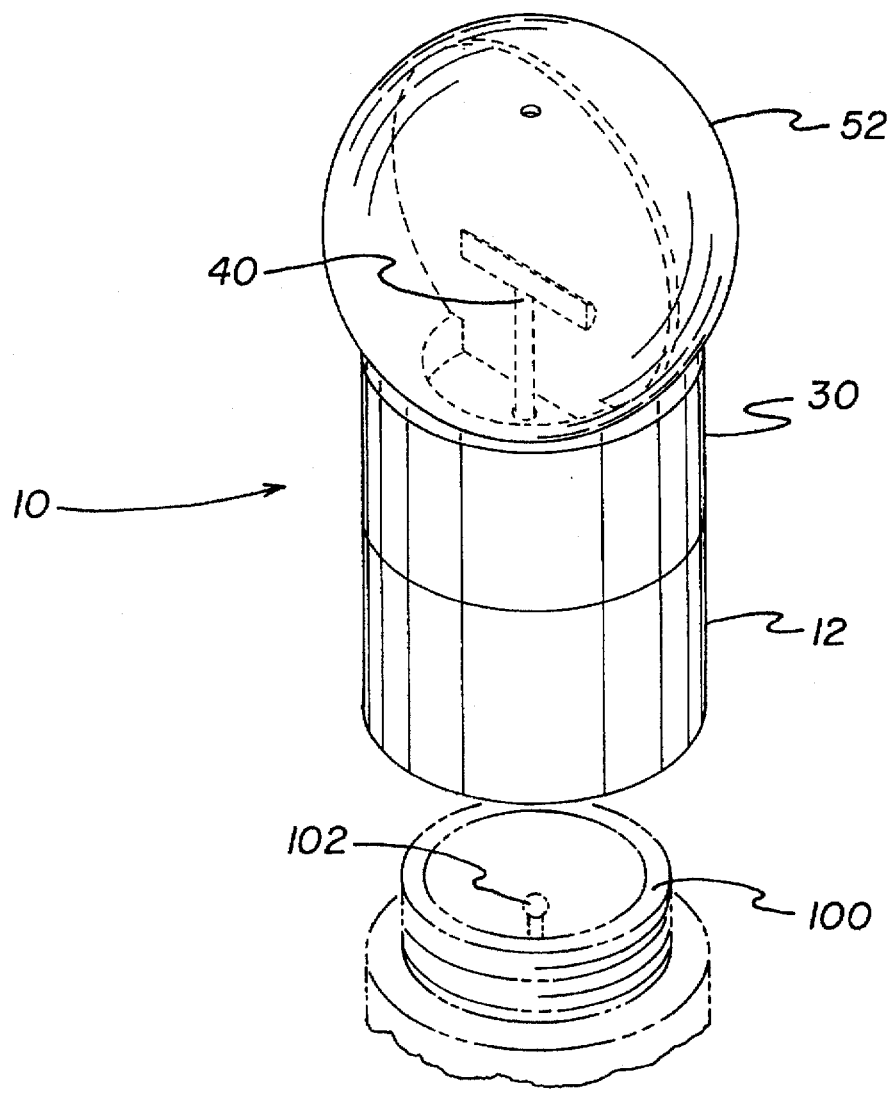
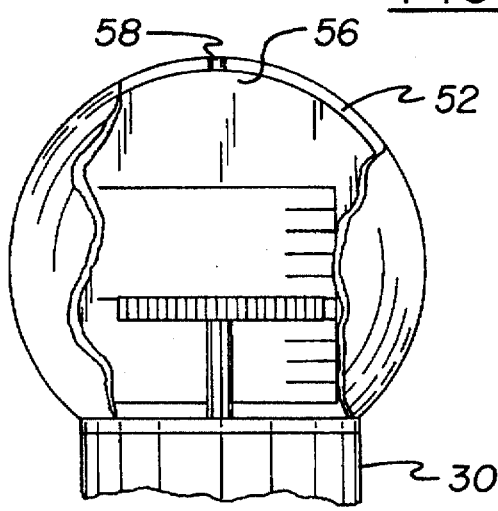
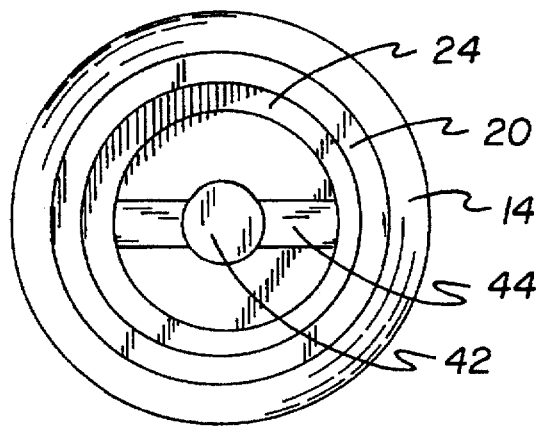

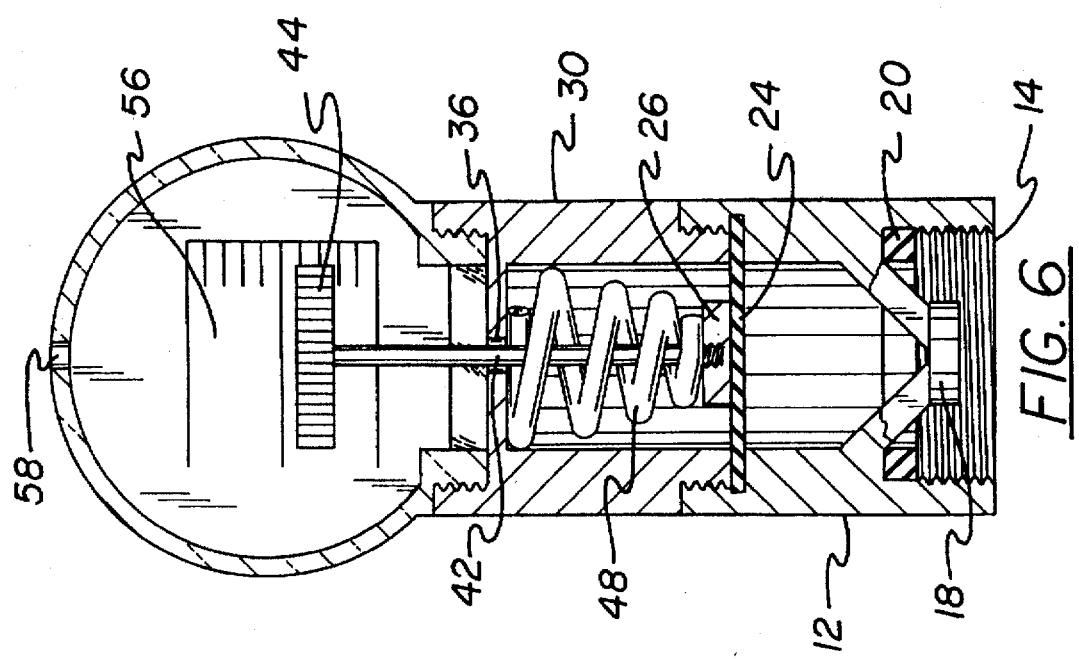
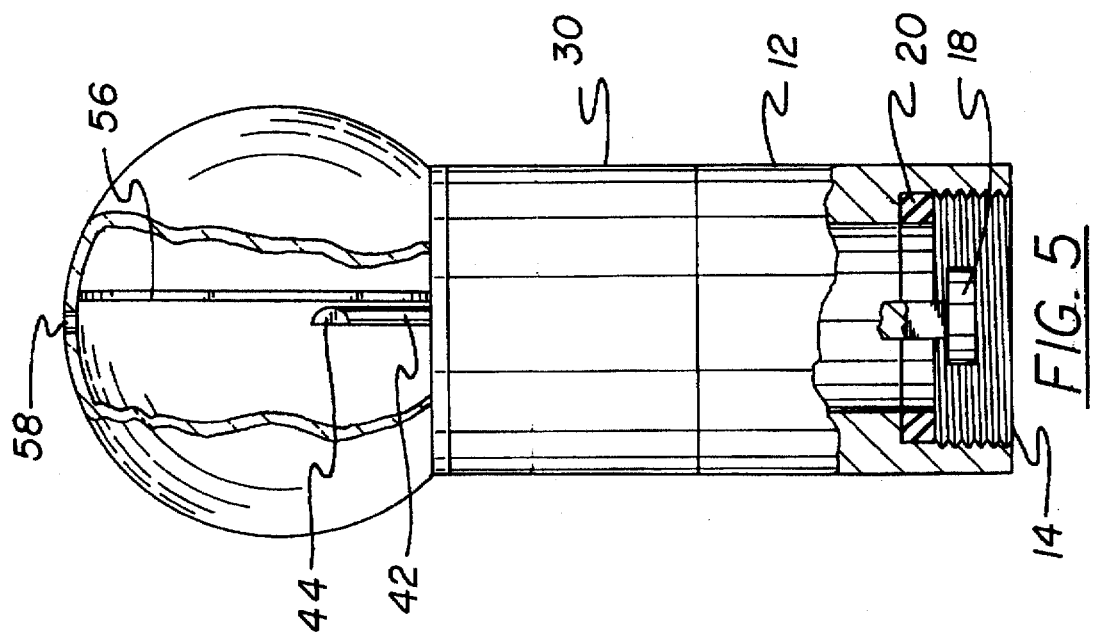

PRESSURE INDICATOR FOR TIRES

BACKGROUND OF THE INVENTION

1. Field of the Invention

The present invention relates to a pressure indicator for tires and more particularly pertains to indicating pressure of a tire through a housing allowing a user to easily read tire pressure within a given tire with a pressure indicator for tires.

2. Description of the Prior Art

The use of pressure indicators is known in the prior art. More specifically, pressure indicators heretofore devised and utilized for the purpose of indicating tire pressure are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,606,391 to Achterholt discloses a valve cap with pressure drop indication for pneumatic tires.

U.S. Pat. No. 5,325,886 to Klink discloses an inflation and pressure indicator apparatus for tires.

U.S. Pat. No. 5,325,808 to Bernoudy, Jr. discloses a filler and pressure indicator valve.

U.S. Pat. No. 5,289,161 to Huang discloses a tire pressure indicator.

U.S. Pat. No. 5,233,864 to Huang discloses a tire pressure indicator.

While these devices fulfill their respective, particular objective and requirements, the aforementioned patents do not describe a pressure indicator for tires for indicating pressure of a tire through a housing allowing a user to easily read tire pressure within a given tire.

In this respect, the pressure indicator for tires according to the present invention substantially departs from the conventional concepts and designs of the prior art, and in doing so provides an apparatus primarily developed for the purpose of indicating pressure of a tire through a housing allowing a user to easily read tire pressure within a given tire.

Therefore, it can be appreciated that there exists a continuing need for new and improved pressure indicator for tires which can be used for indicating pressure of a tire through a housing allowing a user to easily read tire pressure within a given tire. In this regard, the present invention substantially fulfills this need.

SUMMARY OF THE INVENTION

In the view of the foregoing disadvantages inherent in the known types of pressure indicators now present in the prior art, the present invention provides an improved pressure indicator for tires. As such, the general purpose of the present invention, which will be described subsequently in greater detail, is to provide a new and improved pressure indicator for tires and method which has all the advantages of the prior art and none of the disadvantages.

To attain this, the present invention essentially comprises a lower cylindrical housing having an internally threaded open lower end and an internally threaded open upper end. The internally threaded open lower end is dimensioned for removable coupling with a valve stem of a tire. The open lower end has an air receiving portion therein. The air receiving portion has an O-ring secured therearound. A flexible diaphragm is disposed within the internally threaded open upper end of the lower cylindrical housing. The diaphragm has a threaded receiving aperture secured to a central portion thereof. The device includes an upper cylindrical housing having an externally threaded open lower end and an internally threaded upper end. The upper cylindrical housing has an aperture formed through a central portion thereof. The externally threaded lower end is coupled with the internally threaded open upper end of the lower cylindrical housing with the aperture aligned with the threaded receiving aperture of the flexible diaphragm. The device includes a T-shaped indicating pin having a lower vertical end portion extending through the aperture in the upper cylindrical housing to couple with the threaded receiving aperture of the flexible diaphragm. The T-shaped indicating pin has an upper horizontal end extending upwardly from the upper cylindrical housing. A tri-level spring is coupled around the lower vertical end of the T-shaped indicating pin and positioned within the open lower end of the upper cylindrical housing. The device includes a magnifying dome having an externally threaded open lower end adapted for coupling with the internally threaded upper end of the upper cylindrical housing. The magnifying dome receives the upper horizontal end of the T-shaped indicating pin therein. The magnifying dome has an indicating chart positioned therein. The magnifying dome has an aperture formed through an upper end thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pressure indicator for tires which has all the advantages of the prior art pressure indicators and none of the disadvantages.

It is another object of the present invention to provide a new and improved pressure indicator for tires which may be easily and efficiently manufactured and marketed.

It is a further object of the present invention to provide a new and improved pressure indicator for tires which is of durable and reliable construction.

An even further object of the present invention is to provide a new and improved pressure indicator for tires which is susceptible of a low cost of manufacture with regard to both materials and labor, and which accordingly is then susceptible of low prices of sale to the consuming public, thereby making such a pressure indicator for tires economically available to the buying public.

Still yet another object of the present invention is to provide a new and improved pressure indicator for tires which provides in the apparatuses and methods of the prior art some of the advantages thereof, while simultaneously overcoming some of the disadvantages normally associated therewith.

Even still another object of the present invention is to provide a new and improved pressure indicator for tires for indicating pressure of a tire through a housing allowing a user to easily read tire pressure within a given tire.

Lastly, it is an object of the present invention to provide a new and improved pressure indicator for tires comprised of a lower cylindrical housing dimensioned for removable coupling with a valve stem of a tire. A flexible diaphragm is disposed within the lower cylindrical housing. An upper cylindrical housing is coupled with the lower cylindrical housing. A T-shaped indicating pin extends through the upper cylindrical housing to couple with the flexible diaphragm. A tri-level spring is coupled around the T-shaped indicating pin. A magnifying dome couples with the upper cylindrical housing. The magnifying dome has an indicating chart positioned therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the pressure indicator for tires constructed in accordance with the principles of the present invention.

FIG. 2 is a front elevation view of the upper housing of the present invention.

FIG. 3 is an upwardly extending view of the present invention.

FIG. 5 is a side elevation view of the present invention.

FIG. 6 is a front elevation view of the present invention shown in cross-section.

The same reference numerals refer to the same parts through the various Figures.

DESCRIPTION OF THE PREFERRED EMBODIMENT

Figure 4:
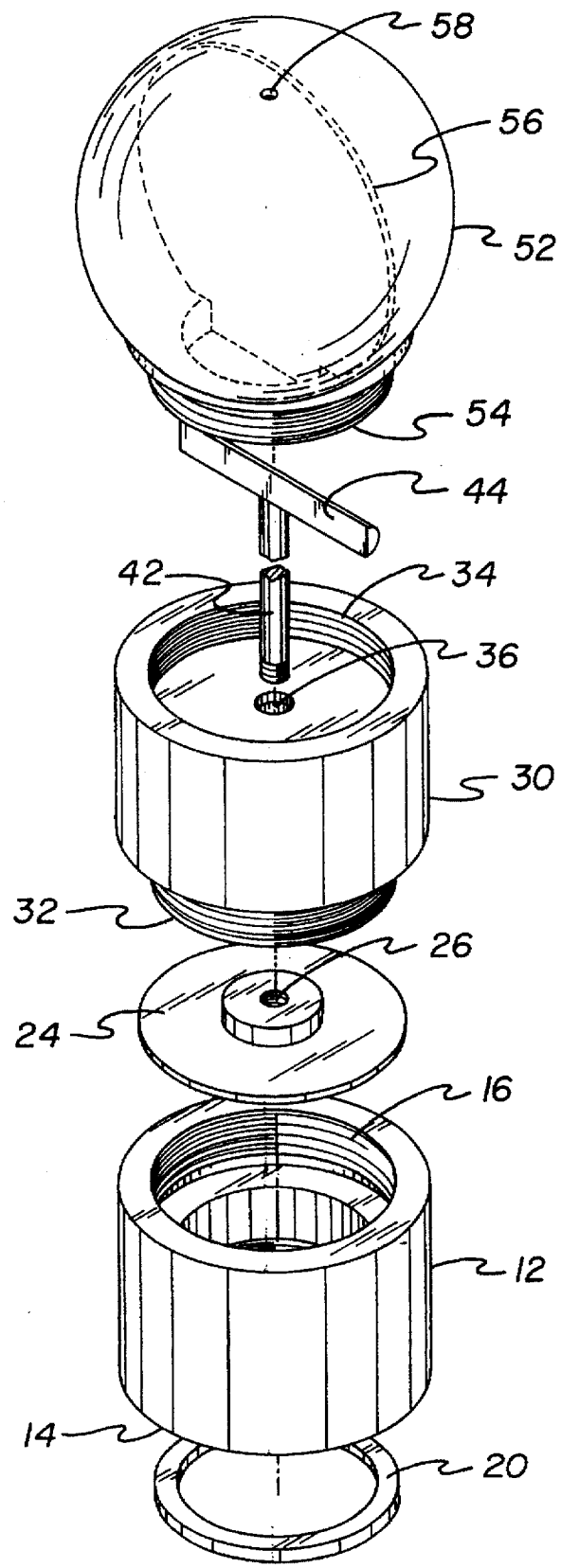
FIG. 4 is an exploded perspective view of the present invention.

With reference now to the drawings, and in particular, to FIGS. 1–6 thereof, the preferred embodiment of the new and improved pressure indicator for tires embodying the principles and concepts of the present invention and generally designated by the reference number 10 will be described.

Specifically, it will be noted in the various Figures that the device relates to a new and improved pressure indicator for tires for indicating pressure of a tire through a housing allowing a user to easily read tire pressure within a given tire. In its broadest context, the device consists of a lower cylindrical housing, a flexible diaphragm, an upper cylindrical housing, a T-shaped indicating pin, a tri-level spring, and a magnifying dome. Such components are individually configured and correlated with respect to each other so as to attain the desired objective.

The device 10 includes a lower cylindrical housing 12 having an internally threaded open lower end 14 and an internally threaded open upper end 16. The internally threaded open lower end 14 is dimensioned for removable coupling with a valve stem 100 of a tire. The open lower end 14 has an air receiving portion 18 therein. The air receiving portion 18 has an O-ring 20 secured therearound. The O-ring 20 provides a tight seal once the lower cylindrical housing 12 is secured to the valve stem 100. The air receiving portion 18 is aligned with the air intake portion 102 of the valve stem 100 to abut the air intake portion 102 to disperse the air therein.

A flexible diaphragm 24 is disposed within the internally threaded open upper end 16 of the lower cylindrical housing 12. The diaphragm 24 has a threaded receiving aperture 26 secured to a central portion thereof. The flexible diaphragm 24 serves to extend upwardly when pressured by air received through the lower housing 12 from the valve stem 100.

Next, the device 10 includes an upper cylindrical housing 30 having an externally threaded open lower end 32 and an internally threaded upper end 34. The upper cylindrical housing 30 has an aperture 36 formed through a central portion thereof. The externally threaded lower end 32 is coupled with the internally threaded open upper end 16 of the lower cylindrical housing 12 with the aperture 36 aligned with the threaded receiving aperture 26 of the flexible diaphragm 24. The upper cylindrical housing 30 is of a similar size and dimension as the lower cylindrical housing 12.

The device 10 includes a T-shaped indicating pin 40 having a lower vertical end portion 42 extending through the aperture 36 in the upper cylindrical housing 30 to couple with the threaded receiving aperture 26 of the flexible diaphragm 24. The T-shaped indicating pin 40 has an upper horizontal end 44 extending upwardly from the upper cylindrical housing 30. Once the flexible diaphragm 24 expands from the air pressure, it causes the T-shaped indicating pin 40 to raise upwardly.

A tri-level spring 48 is coupled around the lower vertical end 42 of the T-shaped indicating pin 40 and positioned within the open lower end 32 of the upper cylindrical housing 30. The tri-level spring 48 surrounds the lower vertical end 42 of the T-shaped indicating pin 40, and it governs the compression of the diaphragm 24 against the T-shaped indicating pin 40.

Lastly, the device 10 includes a magnifying dome 52 having an externally threaded open lower end 54 adapted for coupling with the internally threaded upper end 34 of the upper cylindrical housing 30. The magnifying dome 52 is constructed of a transparent material. The magnifying dome 52 receives the upper horizontal end 44 of the T-shaped indicating pin 40 therein. The magnifying dome 52 has an indicating chart 56 positioned therein. The indicating chart 56 is preferably color coded and clearly marked to indicate the pressure ranges, such as the 25 to 35 lb. range, 35 to 45 lbs., and 45 lbs. and over. The pressure from the tire will cause the flexible diaphragm 24 to expand thereby causing the T-shaped indicating pin 40 to rise with the upper horizontal end 44 thereof aligning with the indicating chart 56 to properly read the amount of air pressure within the tire. The magnifying dome 52 has an aperture 58 formed through an upper end thereof. The aperture 58 is a port to discourage any condensation within the magnifying dome 50.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pressure indicator for tires for indicating pressure of a tire through a housing allowing a user to easily read tire pressure within a given tire comprising, in combination:

a lower cylindrical housing having an internally threaded open lower end and an internally threaded open upper end, the internally threaded open lower end dimensioned for removable coupling with a valve stem of a tire, the open lower end having an air receiving portion therein, the air receiving portion having an O-ring secured therearound;

a flexible diaphragm disposed within the internally threaded open upper end of the lower cylindrical housing, the diaphragm having a threaded receiving aperture secured to a central portion thereof;

an upper cylindrical housing having an externally threaded open lower end and an internally threaded upper end, the upper cylindrical housing having an aperture formed through a central portion thereof, the externally threaded lower end coupled with the internally threaded open upper end of the lower cylindrical housing with the aperture aligned with the threaded receiving aperture of the flexible diaphragm;

a T-shaped indicating pin having a lower vertical end portion extending through the aperture in the upper cylindrical housing to couple with the threaded receiving aperture of the flexible diaphragm, the T-shaped indicating pin having an upper horizontal end extending upwardly from the upper cylindrical housing;

a tri-level spring coupled around the lower vertical end of the T-shaped indicating pin and positioned within the open lower end of the upper cylindrical housing, a lower end of the spring abuts a wall portion of the upper cylindrical housing and an upper end of said spring abuts, the threaded receiving aperture to bias the diaphragm downwardly with respect to the lower cylindrical housing;

a magnifying dome having an externally threaded open lower end adapted for coupling with the internally threaded upper end of the upper cylindrical housing, the magnifying dome receiving the upper horizontal end of the T-shaped indicating pin therein, the magnifying dome having an indicating chart positioned therein, the magnifying dome having an aperture formed through an upper end thereof.

2. A pressure indicator for tires comprising:

a lower cylindrical housing dimensioned for removable coupling with a valve stem of a tire, the lower housing having an air receiving portion;

a flexible diaphragm disposed within the lower cylindrical housing;

an upper cylindrical housing coupled with the lower cylindrical housing;

a T-shaped indicating pin extending through the upper cylindrical housing to couple with the flexible diaphragm;

a tri-level spring coupled around the T-shaped indicating pin with a lower end abutting a wall portion of the upper cylindrical housing and the diaphragm to bias the diaphragm away from the wall portion;

a magnifying dome coupling with the upper cylindrical housing and receiving an upper portion of the T-shaped pin therein, the magnifying dome having an indicating chart positioned therein for selectively aligning with the upper portion of the pin.

3. The pressure indicator as set forth in claim 2 wherein the lower cylindrical housing having an internally threaded open lower end and an internally threaded open upper end, the internally threaded open lower end dimensioned for removable coupling with the valve stem of the tire, the open lower end having the air receiving portion therein, the air receiving portion having an O-ring secured therearound.

4. The pressure indicator as set forth in claim 3 wherein the flexible diaphragm disposed within the internally threaded open upper end of the lower cylindrical housing, the diaphragm having a threaded receiving aperture secured to a central portion thereof.

5. The pressure indicator as set forth in claim 4 wherein the upper cylindrical housing having an externally threaded open lower end and an internally threaded upper end, the upper cylindrical housing having an aperture formed through a central portion thereof, the externally threaded lower end coupled with the internally threaded open upper end of the lower cylindrical housing with the aperture aligned with the threaded receiving aperture of the flexible diaphragm.

6. The pressure indicator as set forth in claim 5 wherein the T-shaped indicating pin having a lower vertical end portion extending through the aperture in the upper cylindrical housing to couple with the threaded receiving aperture of the flexible diaphragm, the T-shaped indicating pin having an upper horizontal end extending upwardly from the upper cylindrical housing.

7. The pressure indicator as set forth in claim 6 wherein the magnifying dome having an externally threaded open lower end adapted for coupling with the internally threaded upper end of the upper cylindrical housing, the magnifying dome receiving the upper horizontal end of the T-shaped indicating pin therein, the magnifying dome having an aperture formed through an upper end thereof.

* * * * *